No. 632,024. Patented Aug. 29, 1899.
E. J. SCHINDEHÜTTE.
NUT LOCK.
(Application filed Mar. 10, 1899.)
(No Model.)
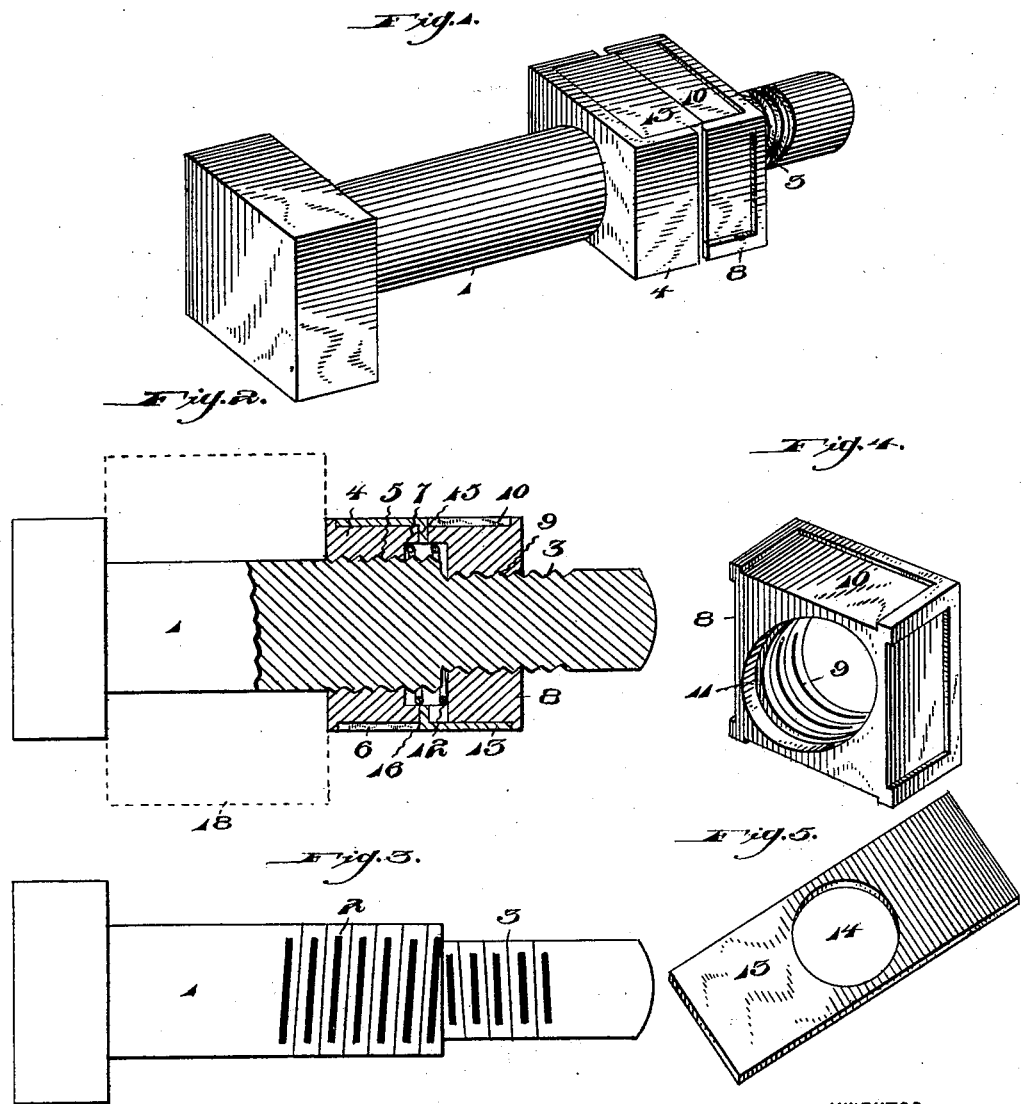
WITNESSES:
INVENTOR
E. J. Schindehütte
BY
ATTORNEYS.

UNITED STATES PATENT OFFICE.

ERNEST JOHN SCHINDEHÜTTE, OF McKEES ROCKS, PENNSYLVANIA.

NUT-LOCK.

SPECIFICATION forming part of Letters Patent No. 632,024, dated August 29, 1899.

Application filed March 10, 1899. Serial No. 708,518. (No model.)

*To all whom it may concern:*

Be it known that I, ERNEST JOHN SCHINDE-HÜTTE, a citizen of the United States of America, residing at McKees Rocks, in the county of Allegheny and State of Pennsylvania, have invented certain new and useful Improvements in Nut-Locks, of which the following is a specification, reference being had therein to the accompanying drawings.

My invention relates to certain new and useful improvements in nut-locks.

The invention relates to nut-locks, and has for its object to provide a simple and cheap device for locking the nuts upon bolts employed in rail connections, upon axles of vehicles, wrist-pins of engines, &c.

With the above object in view the invention consists of certain features of construction hereinafter more specifically described, and particularly pointed out in the claims.

In describing the invention in detail reference is had to the accompanying drawings, forming a part of this specification, wherein like numerals of reference indicate corresponding parts throughout the several views thereof, and in which—

Figure 1 is a perspective view of a nut-lock constructed in accordance with my invention. Fig. 2 is a cross-sectional view of a nut-lock constructed in accordance with my invention. Fig. 3 is a side view of the bolt. Fig. 4 is a perspective view of my improved nut. Fig. 5 is a perspective view of a washer before bent against the nuts.

Referring to the drawings by reference-numerals, 1 designates a bolt in this instance, or it may be a wrist-pin or other similar object, upon which it is designed to lock a nut. The said bolt is provided on a portion of its length near its outer end with an ordinary left-hand thread 2, this thread extending to a point near the outer end of the bolt, and beyond said point the diameter of the bolt is reduced and is provided with the right-hand thread 3.

4 designates a square or other shaped nut having the internal thread 5 designed to fit the main thread 2 of the bolt and provided upon each of its sides with a recess 6. The nut 4 is provided on its outer face with a circular cut-away portion which is of greater diameter than the screw-threaded aperture, thereby forming a shoulder 7.

8 designates a square or other shaped nut having an internal thread 9 designed to fit the right-hand thread 3 of the smaller portion of the bolt and provided upon each of its sides with a recess 10. The nut 8 is provided on its inner face with a circular cut-away portion which is of the same diameter as the circular cut-away portion in the nut 4, but of greater diameter than the screw-threaded aperture, thereby forming the shoulder 11. The circular cut-away portions on the inner face of the nut 8 and the outer face of the nut 4 are adapted to register and surround a spring 12, which is arranged on the larger screw-threaded portion of the bolt.

13 designates a washer or locking-plate which is formed with an opening 14 of greater diameter than the screw-threaded aperture of the bolt and is adapted to have each end thereof bent downwardly, as at 15 16, into one of the recesses formed on the sides of the nuts. It will of course be observed that the ends of the washer or locking-plate are bent in opposite directions.

The operation of my improved nut-lock is as follows: After the nut 4 is placed upon the larger screw-threaded portion of the bolt the spring is arranged within its cut-away portion. The washer or locking-plate is then inserted upon the nut, and the one end is bent downwardly into the recess shown at 6. The nut 8 or jam-nut is then inserted upon the smaller screw-threaded portion of the bolt, and after tightening the same against the washer and spring the other end of the locking-plate or washer is bent downwardly into one of the recesses 10 on the side thereof.

By the arrangement of the circular cut-away portions of the outer face of one of the nuts and the inner face of the other to allow of the arrangement of the spring upon the bolt the pressure of the spring against one of the nuts will prevent the same from rattling. The jam-nut, as its name implies, serves its ordinary function upon the opposite nut and in turn is locked by one of the ends of the locking-plate or washer against any possibility of retrogression, and by having the circular cut-away portion on the inner face thereof it will allow of the jam-nut being run upon the bolt and a portion thereof over the larger screw-threaded portion of the bolt, so the recess formed in the side thereof can properly receive the bent portion of the locking-plate or washer.

It will be noted that various changes may be made in the details of construction without departing from the general spirit of my invention.

Having thus fully described my invention, what I claim as new, and desire to secure by Letters Patent, is—

1. In a nut-lock the combination of a bolt having one portion of greater diameter than the other, a nut mounted on the said portion of greater diameter having its outer face formed with a circular cut-away portion, a nut mounted on the smaller portion of the said bolt having its inner face formed with a circular cut-away portion, a washer or locking-plate mounted on the said bolt having an opening arranged therein adapted to register with the cut-away portions, and a spring mounted on the said bolt arranged within the cut-away portions adapted to bear against the outer face of one and the inner face of the other nut to prevent rattling, substantially as set forth.

2. In a nut-lock the combination of a bolt having a portion thereof of greater diameter, a nut mounted on this portion of greater diameter having its outer face formed with a circular cut-away portion and its edges formed with recesses, a nut mounted on the smaller portion of the said bolt having its inner face formed with a circular cut-away portion and its edges formed with recesses, a washer mounted on the said bolt having an opening therein adapted to register with the cut-away portions, and adapted to have the ends thereof bent to engage the recesses formed in the sides of the nuts, and a spring mounted on the said bolt arranged within the cut-away portions adapted to bear against the outer face of one and the inner face of the other nut to prevent rattling, substantially as set forth.

In testimony whereof I affix my signature in the presence of two witnesses.

ERNEST JOHN SCHINDEHÜTTE.

Witnesses:
 JOHN NOLAND,
 E. W. ARTHUR.